July 10, 1962  R. F. KEMP  3,044,045
TRANSDUCING METHOD AND SYSTEM
Filed Jan. 2, 1958  3 Sheets—Sheet 1
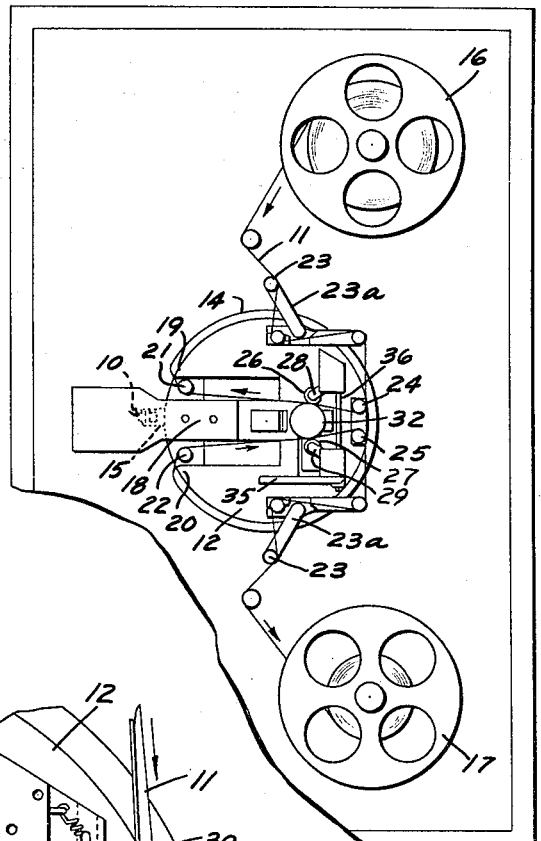
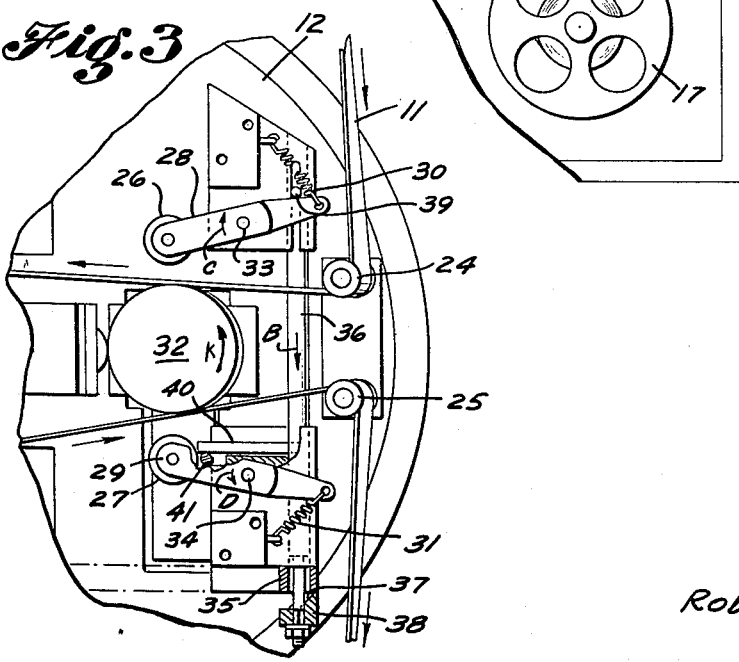
Robert F. Kemp
INVENTOR.
BY Albert Rosen
Moris Spector
ATTORNEYS

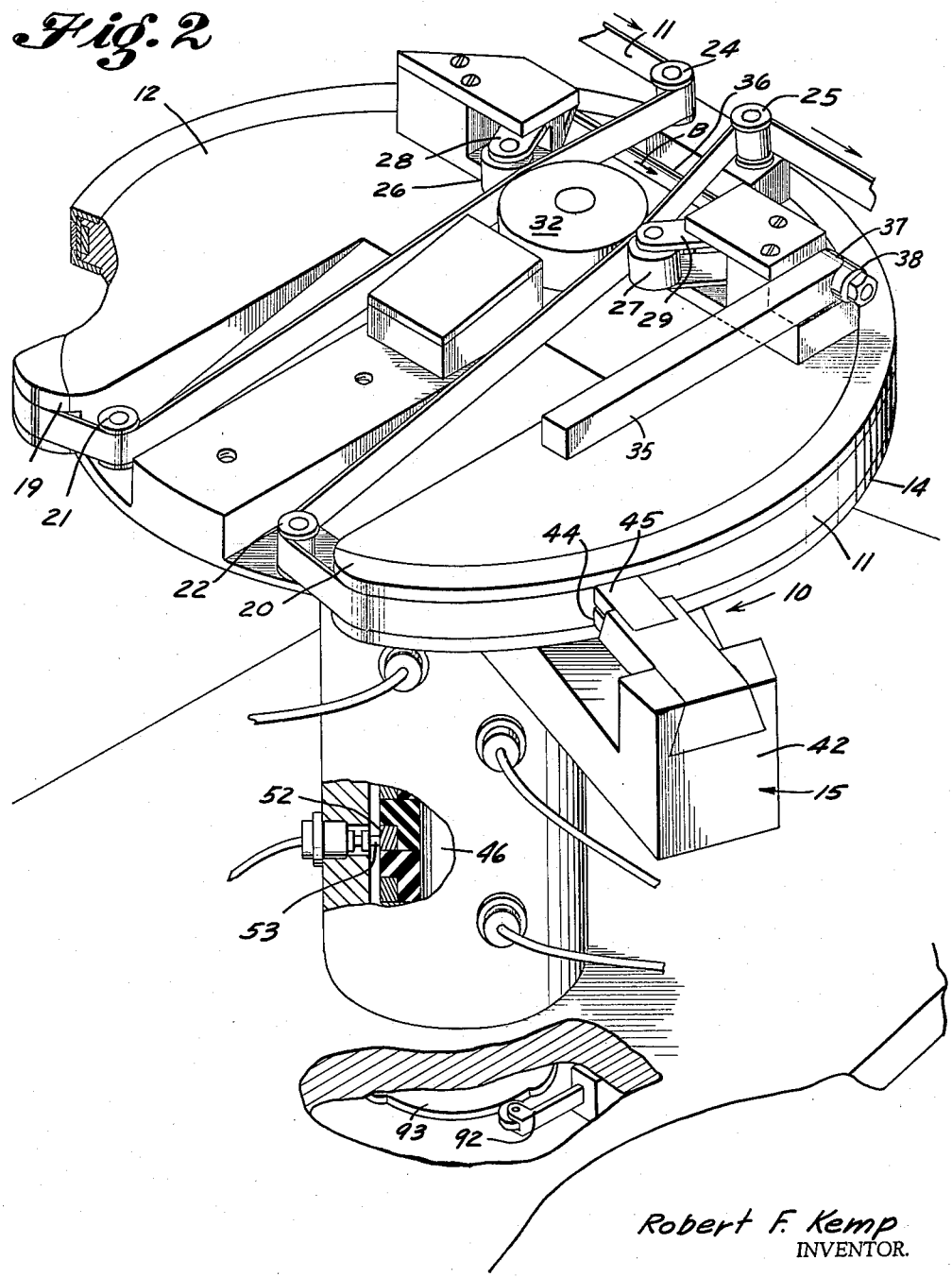

3,044,045
TRANSDUCING METHOD AND SYSTEM

Robert F. Kemp, Redondo Beach, Calif., assignor, by mesne assignments, to Space Technology Laboratories, Inc., El Segundo, Calif., a corporation of Delaware
Filed Jan. 2, 1958, Ser. No. 706,694
12 Claims. (Cl. 340—174.1)

This invention relates to methods and systems for the visual display of signals. In particular, the invention concerns systems which make use of recording apparatus for presenting low repetition rate phenomena as continuous visual displays.

It is often desirable to present low repetition rate phenomena as a continuously bright picture that remains stationary in location but which slowly changes in character. However, the usual approaches to this problem have not proven entirely satisfactory. For example, in data analysis it is often desirable to slow down the presentation rate of high speed, repetitive phenomena and to present the data in visual form on the screen of an oscilloscope. However, in previous arrangements a slowing down of the presentation rate usually involves the introduction of flicker. Even with the use of long persistence oscilloscope screens, one portion of the displayed picture often fades before the completion of presentation of the picture. The foregoing problem becomes especially acute in the presentation of low repetition rate radar signals. In radar, the repetition rate of the received radar signal or sweep is usually so low that only one small portion of a radar sweep is brightly displayed on an oscilloscope screen at one time, the other portions of the radar sweep fading while the one portion is displayed.

Accordingly, one object of the invention is the provision of an improved method and system for the presentation of low repetition rate phenomena.

Another object is the provision of an improved method and system for the presentation of low repetition rate phenomena as a bright, continuous, visual display that remains stationary in location but which slowly changes in character.

A further object is the provision of an improved way of displaying radar sweeps.

According to the invention, low repetition rate phenomena, such as radar sweeps, are presented as a uniformly bright, continuous, slowly changing visual display. This is accomplished by recording the radar sweeps (or other low repetition rate phenomena) on magnetic tape, playing back the recorded sweeps on a playback mechanism of the type in which the playback head is movable independently of the tape for scansion of a portion of a continuous length of tape, and presenting the playback sweeps on the screen of a cathode ray oscilloscope. Each scansion of the tape portion by the playback head is chosen to correspond in time to one picture frame on the oscilloscope screen. Then, with the use of appropriate synchronizing pulses on the tape, when the tape is slowly moved the picture displayed on the oscilloscope screen remains stationary but slowly changes in character. The length of tape supported for scansion by the playback head is chosen such that it accommodates the recordings of just short of two radar sweeps; first one sweep is synchronized with the oscilloscope and is displayed for a number of times, once during each scansion of the playback head around the disk (the fragmentary next sweep is not shown on the screen since it would not yet be synchronized with the oscilloscope), until the succeeding radar sweep is to be presented, when only the succeeding radar sweep is presented.

In the drawing, wherein like reference characters refer to like parts:

FIGURE 1 is a plan view of apparatus used in practicing the invention;

FIGURE 2 is an enlarged perspective view of a part of the apparatus of FIGURE 1;

FIGURE 3 is an enlarged fragmentary view of a tape clamping mechanism of the apparatus of FIGURE 1 in an "open" position;

Figure 4:
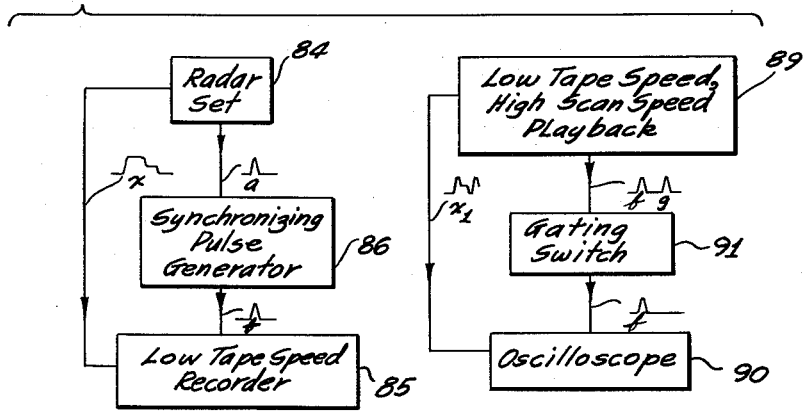
FIGURE 4 is a block diagram of a system for presenting low repetition rate phenomena as a bright, continuous display on the screen of a cathode ray oscilloscope.

Since one of the more important embodiments of the method and system of the invention makes use of a particular type of magnetic tape recording and playback apparatus, the apparatus will be described before the method and system are explained in detail. The type of apparatus referred to makes use of a magnetic recording (or playback) head that rotates at a high velocity about a portion of a continuous length of magnetic tape on which a low repetition rate signal is recorded.

Apparatus Used in Practicing the Invention

As illustrated in FIGURE 1, the magnetic recording and playback apparatus comprises a transducing assembly 10, to be described, mounted for continuous, high velocity rotation in a circular path about magnetic tape 11. The tape 11 is supported in an arcuate path around the periphery of a support disk 12 and adjacent to the path of travel of the assembly 10 for scansion by it. The tape 11 is continuously fed to the peripheral support surface 14 of the support disk from a position outside of the plane of rotation of the assembly 10 so that the tape may be continuously fed to scanning position around the disk without interfering with the rotation of the assembly. If the tape 11 is slowly advanced in the arcuate path during the scansions, successive portions of the tape are scanned at high velocity while the tape itself is moved at low velocity. If the tape is maintained stationary during the rotation of the assembly, one tape portion is subjected to repeated scansions. Consequently, the relative velocity between the transducing assembly 10 and tape 11 may be made as low as desired, or as high as several thousand inches per second. As will be explained in connection with FIGURES 4 and 5, the repeated scansions of a recorded signal are presented to a cathode ray oscilloscope having a sweep synchronized with the rotation of the transducing assembly 10. The oscilloscope thus presents a continuous, bright, graphical presentation of the signal recorded on the portion of tape being scanned.

The recording and playback apparatus is shown in greater detail in FIGURE 1. The magnetic transducing assembly 10 is fixed to an arm assembly 15 mounted for rotation about the cylindrical outside support surface 14 of the disk 12 so that as the arm assembly 15 rotates the transducing assembly 10 scans the tape. The tape 11 is threaded from a tape supply reel 16, around and along the outside or tape support surface 14 of the disk 12, and then to a take-up reel 17. As will be explained, the movement of the tape 11 along the support surface 14 is effected in such a manner as to avoid interference with the rotation of the arm assembly 15 around the surface.

The apparatus of the invention is described in greater detail in connection with FIGURE 2. The support disk 12, fixed to a frame 18 (shown in FIGURE 1), has a cylindrical tape support surface 14 that extends through about 300 degrees of a circle. The support disk 12 is provided with entrance and exit portions, 19 and 20, respectively, through which the magnetic tape 11 is fed onto and off of the support surface 14. A first set of tape guiding pulleys 21 and 22, positioned adjacent to the entrance and exit portions 19 and 20, are each canted to one side so that magnetic tape 11 may be fed by the pulleys onto and off of the disk surface 14 from a position to one side of the plane of the disk. A second set of tape guiding pulleys 24 and 25 are positioned on the side of the disk 12 remote from the first set of pulleys 21 and 22 to better enable the passage of the tape to the disk surface from the aforementioned position on one side of the plane of the disk. The second set of pulleys 24 and 25 are each canted in the same direction as that of the first pulleys 21 and 22 to guide the tape back into a plane parallel to, but spaced from, the plane of the disk 12. The cant of each of the pulleys in the second set is illustrated in FIGURE 3. The second set of pulleys 24 and 25 guide the tape 11 from and to, respectively, the tape supply and take-up reels located on the one side of the plane of the disk.

Motors (not shown) connected to the supply and take-up reels 16 and 17, respectively, provide continuous tension on the tape through the apparatus. Tension pulleys 23 (FIGURE 1) mounted on spring biased arms 23a maintain tension on the tape during the starting and stopping of the apparatus. In the interest of greater clarity these arms and pulleys have been omitted in FIGURE 2. FIGURES 2 and 3 illustrate the means provided for driving the tape 11 around the support surface 14 of the disk 12. FIGURE 2 shows the means in driving position while FIGURE 3 shows the means in a position wherein the tape is released from contact with a capstan 32, the latter position being used during a threading of the tape through the apparatus. The tape driving means takes the form of a pair of clamping rollers 26 and 27 mounted on supports 28 and 29, respectively, and spring biased by springs 30 and 31 for pressure contact against the capstan 32. The supports 28 and 29 are mounted on pivots 33 and 34, respectively, fixed to the disk 12. The capstan 32 is connected to a motor (not shown) for rotation in direction K for moving the tape through the apparatus. If the capstan motor referred to is of a reversible type, the tape may be driven in either of two directions through the apparatus.

Means are also provided for moving the clamping rollers 26 and 27 away from the capstan 32, from the "closed" position illustrated in FIGURE 2 to the "open" one illustrated in FIGURE 3, during a threading of the magnetic tape 11 around the disk support surface 14, and for moving the rollers back into spring biased contact against the capstan during operation of the apparatus. A control arm 35 (FIGURE 3) is fixed to a control shaft 36 terminating at one end 37 in a cam follower surface at an oblique angle to the axis of the shaft. The cam follower 38 of the control shaft 36 is arranged to lie in the position illustrated in FIGURE 2 during operation of the apparatus, when tension is required between the clamping rollers 26 and 27 and the capstan 32, and moves in direction B to the position illustrated in FIGURE 3 when the control arm 35 is raised in a direction away from the plane of the support disk 12 (in a direction up, out of the plane of the drawing). When the control shaft 36 moves in direction B it moves a pin 39 fixed to the shaft in the same direction and against the support 28 of one clamping roller 26. This urges the roller 26 in a direction C away from the capstan 32. The movement of the shaft 36 in direction B also effects a movement of an arm 40, fixed to the shaft, in direction B. The movement of the arm 40 in direction B moves a pin 41 fixed to the other support 29 thus moving the other clamping roller 27 in a direction D away from the capstan 32. The springs 30 and 31 aforementioned return the clamping rollers 26 and 27 to their positions against the capstan 32 when the control arm 35 is returned to the position shown in FIGURE 2.

As illustrated in FIGURE 2 the transducing assembly 10 of the apparatus is made up of a pair of transducing heads, such as playback heads 44 and 45, mounted on a support arm 42, the arm being fixed to a spindle 46 for rotation therewith. The arm 42 supports the heads 44 and 45 for movement in an arcuate path adjacent to the disk surface 14 in planes containing the disk support 12 and in contact with tape 11 supported on the disk surface. The heads 44 and 45 are positioned to scan transversely spaced portions of the disk surface 14. The spindle 46 is connected to be rotated by a constant speed motor (not shown) for effecting uniform rotation of the heads 44 and 45 around the disk surface.

The spindle 46 is provided with a number of electrical slip rings 52 each positioned to be engaged by a pick-up brush 53. The outputs of the heads 44 and 45 are connected to preamplifiers (not shown) housed within the arm 42 and the outputs of the preamplifiers are connected to the slip rings 52 for connection by means of the brushes 53 to appropriate utilization devices.

*Method and System of the Invention*

As has been indicated above, low repetition rate phenomena, such as signals received by radar antenna sweeps, are presented as a uniformly bright, continuous, slowly changing display on the screen of a cathode ray oscilloscope by the use of a method and system of the invention. As illustrated in the block diagram of FIGURE 4, signals X from the receiver of a radar set 84 are fed into low tape speed tape recording apparatus 85. The recording apparatus 85 may be any one of the conventional tape recorders ordinarily available.

The speed of the tape through the recording apparatus 85 is preferably chosen such that signals received during just short of two complete radar antenna sweeps are recorded on the length of tape that can be scanned by one scansion of a playback head around the tape portion being scanned when the tape is reproduced by the playback apparatus shown in FIGS. 1–3. Thus, if a 30 inch length of tape can be accommodated for scansion at one time in the apparatus of FIGS. 1–3, then the speed of the tape through the recording apparatus is chosen to be such that one radar sweep is recorded on a little more than 15 inches of tape. (Each radar sweep may, for example, take 4 seconds.) A synchronizing pulse generator 86 is connected to the radar set 84 and to the recording apparatus 85 to record, on the magnetic tape, impulses indicative of the start of each radar sweep. The synchronizing pulse generator 86 may, for example, be any amplifier circuit connected to the radar transmitter of the set 84 for receiving a portion $a$ of the transmitted radar pulse and presenting it as a pulse $f$ to the recorder to indicate the start of a new radar sweep cycle. The synchronizing signals are shown in FIGURE 5 as recorded on a separate recording track 87 adjacent to the signal track 88.

Figure 5:
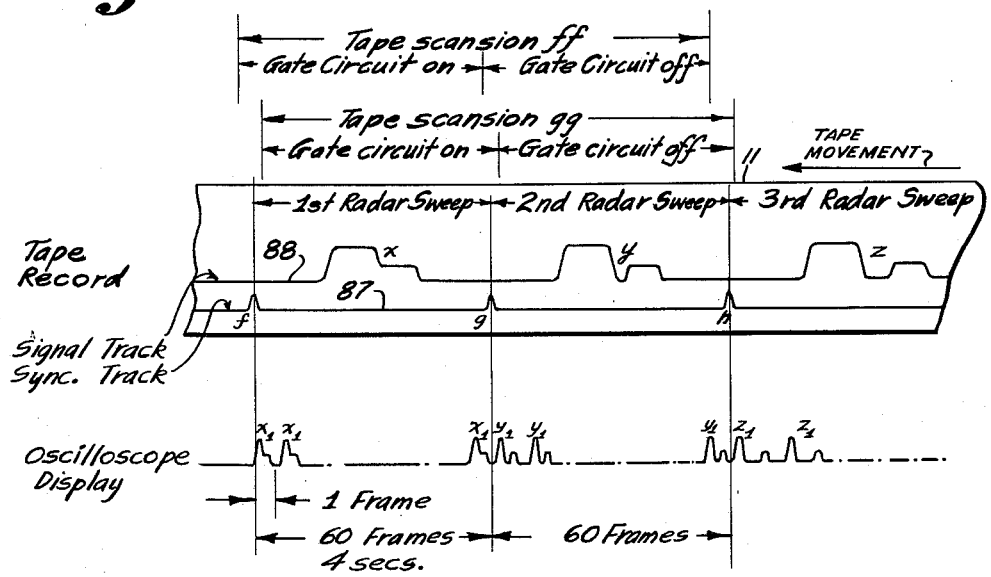
FIGURE 5 is a schematic representation of the signals recorded on a section of tape and of the signals presented to a cathode ray oscilloscope, in the system of FIGURE 4.

As shown in FIGURES 4 and 5, the tape is then played back on playback apparatus 89 of the general type shown in FIGS. 1–3 and the signals $x_1$ are displayed on the screen of an oscilloscope 90 to which the playback apparatus is connected. In the playback apparatus the tape is scanned by playback heads moving in a direction opposite the direction of tape travel and at a substantially higher speed than the speed of the heads during the recording. The playback scanning speed is at the rate of one revolution of the playback head about the tape for each oscilloscope frame. If 15 oscilloscope frames per second are needed to present a continuous bright display, then the playback head is rotated at the rate of 15 revolutions per second. A gating circuit 91 (described below) passes the output of the synchronizing track 87 to trigger the start of each oscilloscope frame on the receipt of the first synchronizing pulse following the start of each scansion. This is accomplished by having the gating circuit switched on at the start of each scansion and remain on for exactly one-half scansion. This allows the synchronizing pulse to reach the oscilloscope 90 only during the first half of a scansion and assure that a full frame will be displayed. Thus, during scansion of tape length ff, an oscilloscope frame sweep starts on receipt of the first synchronizing pulse f. The next synchronizing pulse g is ignored since the gating circuit is now off. When the tape has moved a distance such that a new set of synchronizing pulses is under scansion by the playback heads, e.g., such that tape length gg is under scansion, the next oscilloscope frame sweep would start on receipt of pulse g, ignore pulse h, and then start again on the receipt of the next pulse g. Thus as the tape 11 moves through the playback apparatus, only a predetermined length of tape will be under scansion. A frame will be presented to the display device only after a first synchronizing pulse (f, g, etc.) has been intercepted during the scansion distance. When the tape length ff is under scansion as illustrated in FIG. 5, the first synchronizing pulse f will be intercepted when the gate circuit is energized. After the tape has moved a short distance (as shown by tape scansion gg), the first synchronizing pulse f will not be intercepted during any portion of the scansion. During the interval of the tape scansion gg when the gate circuit is receptive to a synchronizing pulse, only the synchronizing pulse g will come under scansion. At a substantially later time the tape will have moved sufficiently so that the synchronizing pulse g is no longer under scansion when the gate circuit is on. At this time the next synchronizing pulse h will come under scansion when the gate circuit is energized. As shown in FIG. 5 the transfer from the first radar sweep to the later radar sweep by tape movement from tape scansion ff to tape scansion gg requires a relatively small movement of the tape and the tape may continue to move with the synchronizing pulse g repeatedly under scansion when the gate circuit is energized, until the tape scansion is sufficiently moved so that the synchronizing pulse g is no longer effective.

By means of the foregoing arrangement the low repetition rate radar sweeps (FIGURE 5) are presented on the oscilloscope screen as a stationary display which slowly changes in character. In the above example the display would change in character once every four seconds. Every time the playback heads scan the first frame (15 times a second) the signal recorded thereon is displayed on the oscilloscope 90 as a separate frame. Thus, each radar sweep is displayed 60 times (4 seconds per each full presentation of phenomena times 15 displays per second) to obtain a bright display. The synchronization aforementioned assures that each of the identical first signals $x_1$ is displayed in the same place on the oscilloscope screen even though the playback heads scan a moving tape. When the second radar sweep is to be presented on the screen the new signals $y_1$ are displayed in the place where the previous signals $x_1$ were presented before.

The gating circuit 91 aforementioned is illustrated in FIGURE 2. The circuit 91 takes the form of a microswitch 92 controlled by a cam 93 fixed to the spindle 46 upon which the playback heads are mounted. Since the cam 93 rotates with the heads, the rise and dwell portions of the cam can be oriented such that the microswitch 92 is turned on at the start of each scansion and is turned off half way through the scansion. If the microswitch 92 is connected in series between the output of the synchronizing track and the oscilloscope sweep, only the synchronizing pulses present during the first half of each scansion will be presented to the oscilloscope.

While the invention has been described with respect to the use of magnetic transducing apparatus, it is to be understood that other types of recording and playback systems may instead be used. However, magnetic systems are preferred due to their ease of handling.

From the foregoing it is seen that the invention provides an improved method and means for presenting low repetition rate phenomena as a continuous, slowly changing display on an oscilloscope. While the invention has been described with respect to the display of low repetition rate phenomena, it will be appreciated that it may be used to advantage in other applications.

What is claimed is:

1. A system for presenting low repetition rate phenomena as a continuous visual display comprising: magnetic tape recording means connected to record on magnetic tape signals representative of successive presentations of said phenomena; magnetic tape playback means connected to receive said magnetic tape from said recording means and to continually, concurrently and repeatedly play back tape portions of a predetermined length, each length being sufficient to play back more than one fully presentation of said phenomena; a cathode ray oscilloscope coupled to said playback means for receipt of played back signals therefrom; and gating means connected between said playback means and said oscilloscope to synchronize said oscilloscope with portions of the played back signals representative of full presentations of said phenomena only.

2. A system for presenting low repetition rate phenomena as a continuous visual display comprising: magnetic tap recording means adapted to record on magnetic tape signals representative of successive presentations of said phenomena; synchronizing pulse generator means connected to said recording means to record, along with signals representative of said phenomena, synchronizing signals indicative of the start of each presentation of said low repetition rate phenomena; magnetic tape playback means adapted to receive said magnetic tape from said recording means and to continually concurrently and repeatedly play back tape portions of a predetermined length, each length being sufficient to play back more than one full presentation of said phenomena; a cathode ray oscilloscope connected to said playback means for receipt of played back signals therefrom; and gating means connected between said playback means and said oscilloscope to present to said oscilloscope during each playback scansion only the synchronizing signal indicative of the start of full presentations of said phenomena.

3. A system for presenting low repetition rate phenomena as a continuous visual display comprising: a source of said phenomena; magnetic tape recording means connected to said source to record on magnetic tape signals representative of successive presentations of said phenomena; synchronizing pulse generator means connected between said source and said recording means to record, along with signals representative of said phenomena, synchronizing signals indicative of the start of each presentation of said low repetition rate phenomena; magnetic tape playback means coupled to said recording means by said magnetic tape and to successively play back overlapping tape portions of a predetermined length, each length being sufficient to play back appreciably more than one full presentation of said phenomena; a cathode ray oscilloscope coupled to said playback means for receipt of played back signals therefrom; and gating means connected between said playback means and said oscilloscope to present to said oscilloscope during each playback scansion only the synchronizing signals indicative of the start of full presentations of said phenomena.

4. A system for presenting low repetition rate phenomena as a continuous visual display comprising: magnetic tape recording means connected to record on magnetic tape signals representative of successive presentations of said phenomena; magnetic tape playback means connected to receive said magnetic tape from said recording means and to successively play back overlapping tape portions of a predetermined length, each length being sufficient to play back appreciably more than one full presentation of said phenomena; a cathode ray oscilloscope coupled to said playback means for receipt of played back signals therefrom; means for conducting said magnetic tape from said recording means to said playback means to provide concurrent operation of said recording means and said playback means; and gating means connected between said playback means and said oscilloscope for synchronizing said oscilloscope with portions of the played back signals representative of full presentations of said phenomena only.

5. A system for presenting low repetition rate phenomena as a continuous visual display comprising: magnetic tape recording means connected to record on magnetic tape signals representative of successive presentations of said phenomena; magnetic tape playback means connected to receive said magnetic tape from said recording means during operation thereof and to successively play back overlapping tape portions of a predetermined length, each length being sufficient to play back appreciably more than one full presentation of said phenomena, said playback means including a playback head mounted for rotational movement for effecting playback scansion of said tape portions; a cathode ray oscilloscope coupled to said playback head for receipt of played back signals therefrom; and gating means connected between said playback head and said oscilloscope to synchronize said oscilloscope with portions of the played back signals representative of full presentations of said phenomena only, said gating means including a control member connected to said head for rotational movement therewith, and a switch member mounted for control by said control member for conduction only during a portion of each rotation of said head.

6. The system claimed in claim 5 wherein said control and switch members comprise, respectively, a cam and a cam follower controlled switch.

7. A system for presenting low repetition rate phenomena as a continuous visual display comprising: a source of said phenomena; magnetic tape recording means connected to said source to record on magnetic tape signals representative of successive presentations of said phenomena; synchronizing pulse generator means connected between said source and said recording means to record, along with signals representative of said phenomena, synchronizing signals indicative of the start of each presentation of said low repetition rate phenomena; magnetic tape playback means adapted to receive said magnetic tape from said recording means and to continually and concurrently play back tape portions of a predetermined length, each length being sufficient to play back more than one full presentation of said phenomena and less than two full presentations of said phenomena; a cathode ray oscilloscope coupled to said playback means for receipt of played back signals therefrom; and gating means connected between said playback means and said oscilloscope to present to said oscilloscope only the synchronizing signals indicative of the start of full presentations of said phenomena; said playback means comprising a disk-like support drum positioned to support magnetic tape in an arcuate path around an outside surface thereof, a spindle mounted for continuous rotation with respect to said support drum and having an axis of rotation substantially perpendicular to planes containing said arcuate path, and a playback head mounted on said spindle for continuous rotation in a circular path around and including a portion of said arcuate path and positioned to effect scansion of said tape; said gating means including a member fixed to said spindle for rotation therewith and a switch controllable by said member to pass synchronizing signals from said head to said oscilloscope in response to the angular position of said spindle.

8. A system for presenting low repetition rate phenomena as a continuous visual display comprising: magnetic tape recording means adapted to record on magnetic tape signals representative of successive presentations of said phenomena; synchronizing pulse generator means connected to said recording means to record, along with signals representative of said phenomena, synchronizing signals indicative of the start of each presentation of said low repetition rate phenomena; magnetic tape playback means adapted to receive said magnetic tape from said recording means during operation of said recording means and to continually play back tape portions of a predetermined length, each length being sufficient to play back more than one full presentation of said phenomena; a cathode ray oscilloscope coupled to said playback means for receipt of played back signals therefrom; and gating means connected between said playback means and said oscilloscope to present to said oscilloscope only the synchronizing signals indicative of the start of full presentations of said phenomena; said playback means comprising a disk-like support drum positioned to support magnetic tape in an arcuate path around an outside surface thereof, a spindle mounted for continuous rotation with respect to said support drum and having an axis of rotation substantially perpendicular to planes containing said arcuate path, and a playback head mounted on said spindle for continuous rotation in a circular path around and including a portion of said arcuate path and positioned to effect scansion of said tape; said gating means including a member fixed to said spindle for rotation therewith and a switch controllable by said member to pass synchronizing signals from said head to said oscilloscope in response to the angular position of said spindle.

9. A system for presenting low repetition rate phenomena as a continuous visual display comprising: magnetic tape recording means adapted to record on magnetic tape signals representative of successive presentations of said phenomena; magnetic tape playback means of the type adapted to receive said magnetic tape from said recording means during operation of said recording means and to continually and repetitively play back tape portions of a predetermined length, each length being sufficient to play back more than one full presentation of said phenomena; a display device coupled to said playback means for receipt of played back signals therefrom; and gating means connected between said playback means and said device to synchronize said device with portions of the played back signals representative of full presentations of said phenomena only.

10. A system for presenting low repetition rate phenomena as a continuous visual display comprising: magnetic tape recording means adapted to record on magnetic tape movable therethrough during recording signals representative of successive presentations of said phenomena; synchronizing pulse generator means connected to said recording means to record, along with signals representative of said phenomena, synchronizing signals indicative of the start of each presentation of said low repetition rate phenomena; magnetic tape playback means of the type adapted to receive said magnetic tape from said recording means during movement of said tape through said recording means and to continually play back tape portions of a predetermined length, each length being sufficient to play back more than one full presentation of said phenomena; a display device coupled to said playback means for receipt of repetitively played back signals therefrom; and gating means connected between said playback means and said device to present to said device during each playback scansion only the synchronizing signals indicative of the start of full presentations of said phenomena.

11. A system for presenting low repetition rate phenomena as a continuous visual display comprising: magnetic tape recording means adapted to record on magnetic tape signals representative of successive presentations of said phenomena; magnetic tape playback means adapted to receive said magnetic tape from said recording means and to successively repetitively play back overlapping tape portions of a predetermined length, each length being sufficient to play back appreciably more than one full presentation of said phenomena; a display device coupled to said playback means for receipt of played back signals therefrom; and gating means connected between said playback means and said device for synchronizing said device with portions of the played back signals representative of full presentations of said phenomena only.

12. In a display system for a radar type data processing system having a rate of repetition of similar data phenomena on the order of less than one repetition per second, wherein each visual display of a single display frame is subject to loss of brightness because of limited persistence of a display medium on a cathode ray oscilloscope type display device and wherein bursts of data phenomena are supplied thereto at a rate substantially below that necessary to provide a constant illumination of the display medium, means for increasing the effective repetition rate of the display frame, comprising: recording transducing means receptive of the bursts of data phenomena for recording indicia thereof on a recording medium, with the recording medium moving relative to said recording transducing means at a first low velocity; a playback transducing apparatus concurrently receptive of said recording medium from said recording transducing means at said first low velocity; playback transducing means within said apparatus for playing back said indicia at a second higher velocity, said second higher velocity being on the order of 10 to 100 times greater than said first low velocity; said apparatus being of such dimensions that a length of said recording medium containing substantially more bursts of data phenomena than represent a single display frame is presented for repeated scansion by said playback transducing means; a display device coupled to said playback transducing means for receipt of played-back signals therefrom; and gating means energizable in accordance with the position of said recording medium relative to said playback transducing apparatus for causing display by said display device of but a single frame during each scansion with each display frame being repetitively displayed on the order of 10 to 100 times.

References Cited in the file of this patent

UNITED STATES PATENTS

| | | |
|---|---|---|
| 2,462,435 | Stanton | Feb. 22, 1949 |
| 2,632,815 | Crespinel | Mar. 24, 1953 |
| 2,702,315 | Roderick | Feb. 15, 1955 |
| 2,729,803 | Harrison | Jan. 3, 1956 |
| 2,737,646 | Muffly | Mar. 6, 1956 |
| 2,814,030 | Miller et al. | Nov. 19, 1957 |
| 2,816,157 | Andreas et al. | Dec. 10, 1957 |
| 2,832,840 | Morin | Apr. 29, 1958 |
| 2,885,485 | Eigen | May 5, 1959 |

FOREIGN PATENTS

| | | |
|---|---|---|
| 688,816 | Great Britain | Mar. 11, 1953 |